United States Patent [19]

Goran

[11] Patent Number: 4,955,750
[45] Date of Patent: Sep. 11, 1990

[54] ROPE FASTENER

[76] Inventor: Leo Goran, P.O. Box 1074, Punta Gorda, Fla. 33951-1074

[21] Appl. No.: 402,542

[22] Filed: Sep. 5, 1989

[51] Int. Cl.$^5$ .......................... B25G 3/00; F16B 7/10
[52] U.S. Cl. ....................................... 403/306; 403/379; 24/115 R
[58] Field of Search ...................... 403/306, 379; 24/37, 24/115 R, 122.6, 135 N; 411/533, 480, 482, 469

[56] References Cited

U.S. PATENT DOCUMENTS

| | | | |
|---|---|---|---|
| 27,906 | 4/1860 | Howard | 403/306 X |
| 236,557 | 1/1881 | Covert | 24/135 N |
| 505,215 | 9/1893 | Buffinton . | |
| 1,050,116 | 1/1913 | Ewing | 403/306 X |
| 1,073,720 | 9/1913 | Trewhella . | |
| 1,206,008 | 11/1916 | McCabe . | |
| 1,325,636 | 12/1919 | Guy | 403/379 X |
| 1,642,345 | 9/1927 | Telford | 403/306 X |
| 1,776,133 | 9/1930 | Prindle . | |
| 1,943,020 | 1/1934 | Johnson . | |
| 2,099,628 | 11/1937 | Sampson . | |
| 2,231,238 | 2/1941 | Winchester . | |
| 2,339,671 | 1/1944 | Bergman | 24/115 R |
| 2,389,255 | 11/1945 | Graham . | |
| 2,464,432 | 3/1949 | Brickman . | |
| 3,009,224 | 11/1961 | Alexander . | |
| 3,094,755 | 6/1963 | Casanave . | |
| 3,134,844 | 5/1964 | Myers . | |
| 3,243,859 | 4/1966 | Savastano et al. . | |
| 3,466,712 | 9/1969 | Behney . | |
| 3,704,488 | 12/1972 | Higgins . | |
| 3,745,228 | 7/1973 | Vogt . | |
| 4,136,987 | 1/1979 | Tettamanti . | |
| 4,342,477 | 8/1982 | McClure | 24/135 N X |
| 4,630,984 | 12/1986 | Reinwall et al. | 411/533 X |

Primary Examiner—Andrew V. Kundrat
Attorney, Agent, or Firm—Harness, Dickey & Pierce

[57] ABSTRACT

A rope fastener is disclosed comprising a resilient thermoplastic body having at least one longitudinal passage for receiving a rope therein. The fastener includes one or more nail receiving holes transverse to said passage and extending diametrically across the passage in opposite sides of the body to enable a nail to be driven through the rope and the fastener body to retain the rope in the fastener body. The fastener has several uses including connecting two ropes together, forming a loop of the end of a rope, forming a rope ladder, attaching other objects to a rope such as a flag, or attaching hooks or other fastening devices to a rope or elastic cord. Depending on the application, the fastener may have one or more longitudinal passages and the number and size of the nails is dependent on the tensile loads to be carried by the rope.

14 Claims, 2 Drawing Sheets

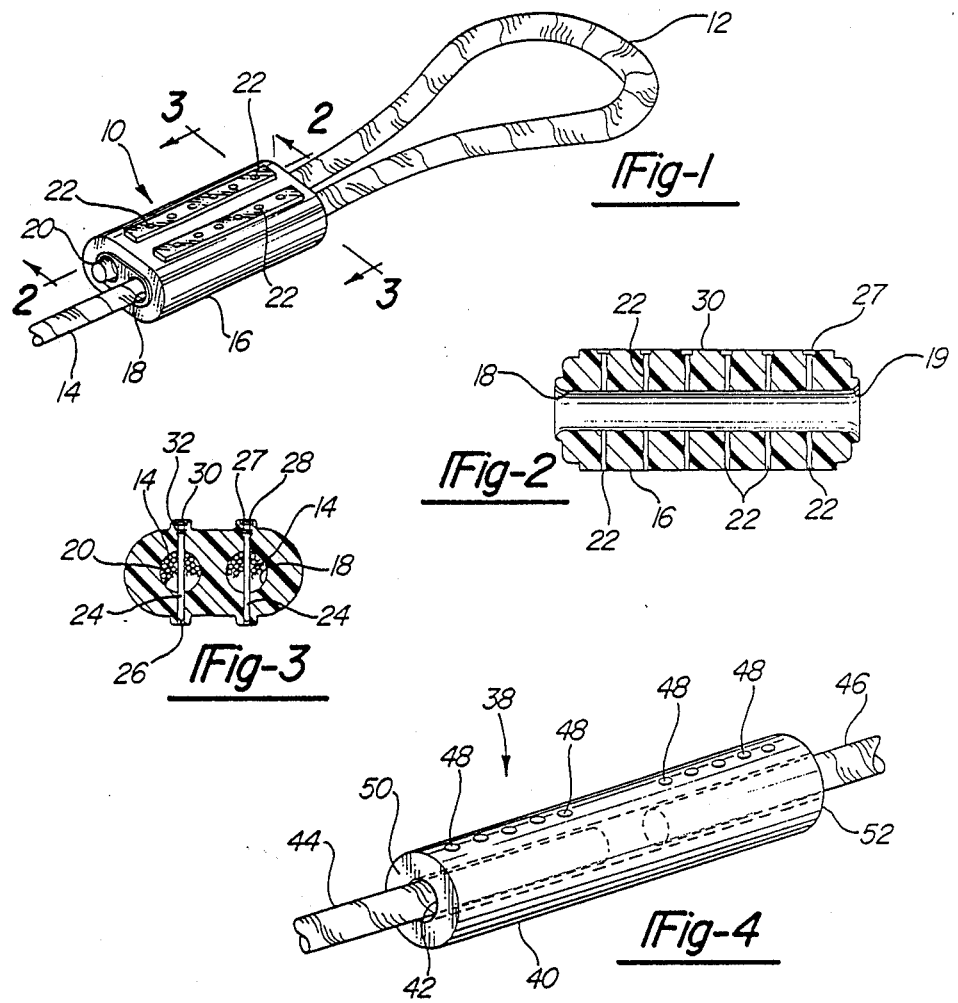
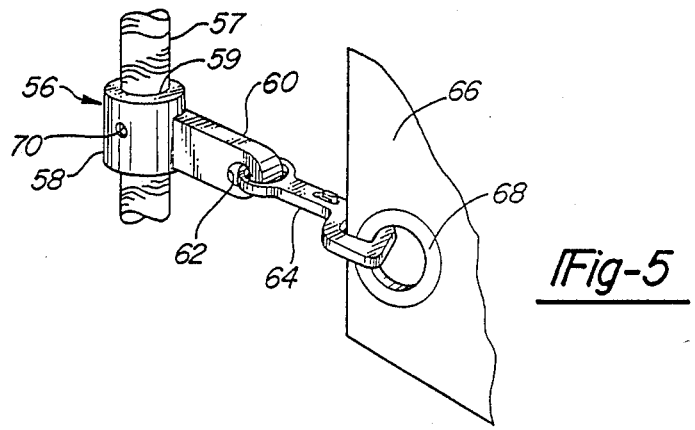

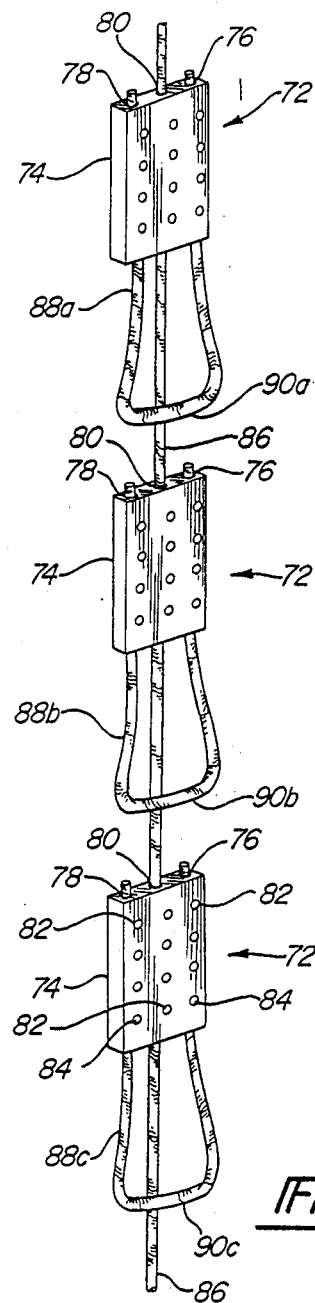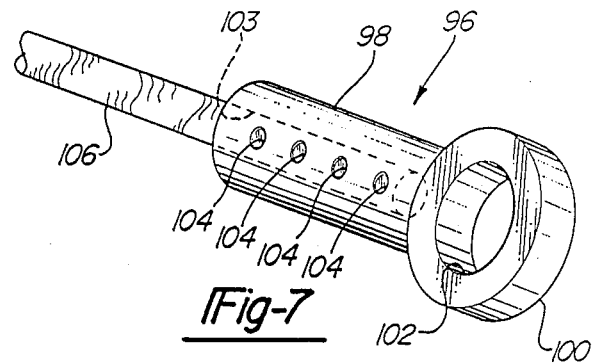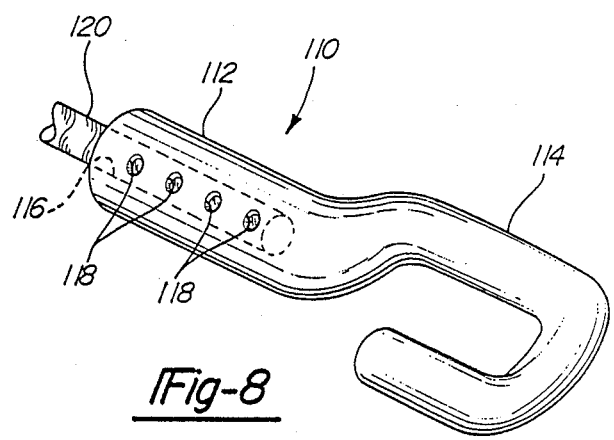

ROPE FASTENER

BACKGROUND AND SUMMARY OF THE INVENTION

This invention relates to a rope fastener and in particular to a fastener for connecting two ropes together, forming a fixed loop at the end of a rope, or constructing a rope ladder, etc. which provides a secure attachment and a clean overall appearance.

In many rope applications, it is often necessary to connect two ropes together, form a fixed loop at the end of a rope or make other rope connections. To connect ropes knots are typically tied at the ends of the ropes. Knots are unsightly in appearance and require knowledge of knot tying and cannot be easily performed if the rope is nylon and has dried out from age and is less pliable. The formation of woven splices requires special skills and is difficult to perform on ropes which have hardened with age. Weaving ropes is a process which is both time consuming and difficult. Often, the resulting loop is not of the size intended and provides an unsightly appearance.

Current rope fasteners or clamps use a variety of mechanisms for making the rope connection. Some fasteners employ a wedge type mechanism to grip or pinch the rope. Another device uses a metal body which is crimped around the rope using a special crimp tool, and a staple is driven through one side of the crimped body and the rope to hold the malleable body in position and secure the rope. Still other devices serve as blocks which are tied to the ropes.

Each of these devices have some disadvantage associated with its use. A wedge type fastener will often not hold a rope securely, especially with nylon ropes. The crimp type fasteners require special tools to install and the staples can cut rope fibers and weaken the rope. Fasteners employing knots are unsightly and can come undone during use.

Accordingly, it is an objective of this invention to provide a rope fastener for making a number of rope connections which overcomes the disadvantages of the prior fasteners and which provides a neat and uniform appearance and a strong durable connection.

It is a further object to provide a rope fastener with the above features for use in marine applications in which the fastener must be corrosion resistant and must not scratch a boat fiberglass surface.

The rope fastener of the present invention is preferably made of an extruded or molded thermoplastic material having a body with at least one longitudinal passage extending therethrough. One or more nail receiving holes extend transversely through the body and diametrically across the longitudinal passage. The rope is inserted into the longitudinal passage and nails are driven through the body and the rope to hold the rope in the fastener body. The nails extend through the body on opposite sides of the longitudinal passage so as to be firmly anchored into the fastener body.

The fastener can include a single longitudinal passage for reception of two rope ends into the passage in an abutting relationship which are each secured to the fastener by a plurality of nails through each rope. In another embodiment, the rope fastener includes two parallel longitudinal passages which can be used to form a fixed loop at the end of a rope. In yet another embodiment, the fastener includes three longitudinal passages which can be used to form a rope ladder comprised of rope loops supported by the fastener from a central rope. In yet other embodiments, the fastener is used to secure a hook or other mounting devices to a rope or elastic cord which previously required one or more knots in a rope.

It is an advantage of the rope fastener of this invention that it requires no special tools to assembly. It is a further advantage that the fastener is low cost and easy to use. It is yet another advantage that the fastener provides a reliable and secure connection to a rope and has a neat overall appearance.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of the rope fastener of this invention being used to form a fixed loop at the end of a rope;

FIG. 2 is a sectional view of the rope fastener in FIG. 1 as seen from substantially the line 2—2 of FIG. 1 illustrating the longitudinal passage and the transverse nail receiving holes in the fastener body with the rope removed from the passage;

FIG. 3 is a cross sectional view of the rope fastener as seen from substantially the line 3—3 of FIG. 1;

FIG. 4 a perspective view of a modified form of the rope fastener having one passage used to connect two ropes together end to end;

FIG. 5 is a perspective view showing a modified form of the rope fastener used to secure a flag to a rope;

FIG. 6 is a perspective view of a modified form of the rope fastener having three longitudinal passages used to construct a rope ladder;

FIG. 7 is a perspective view of a modified form of the rope fastener used to secure a circular mounting boss to the end of the rope or elastic cord; and FIG. 8 is a perspective view of a modified form of the fastener of the present invention used to secure a hook to the end of a rope or elastic cord.

DETAILED DESCRIPTION OF THE INVENTION

The rope fastener of the present invention is shown in FIG. 1 and designated generally at 10 and is being used to form a loop 12 in the end of a rope 14. The fastener 10 is comprised of a body 16 of a plastic material, preferably a molded or extruded thermoplastic resin. The body 16 includes two parallel longitudinal passages shown as cylindrical bores 18 and 20 extending through the body. Each of the bores 18 and 20 have a plurality of transverse nail receiving holes 22 which extend through the plastic body 16 on opposite sides of the longitudinal bores and diametrically across the bores 18 and 20. The nail receiving holes extending across the bore 18 are generally parallel to the nail receiving holes extending across the bore 20.

The rope 14 is secured in the longitudinal bores by nails 24 which are driven through the nail receiving holes and through the rope 14. The nails include a smooth point 26 which is used to spread apart the rope fibers while it is penetrating through the rope without cutting the fibers. The shaft of the nail must have a smooth surface where the nail shafts contacts the rope so as not to abrade the rope fibers reducing the strength of the rope. The nails are preferably made of a corrosion resistant metal such as stainless steel and can be made with or without head 28. The nail receiving holes 22 include a countersink 27 at one end to enable the head 28 of the nails to be seated below the top surface 30 of the body 16, if a head on the nail is used. The nails are of a length such that when the nail is completely installed in body 16, no portion of the nail extends from the body 16, thus eliminating the possibility of the nails scratching or marring an object used with the rope.

To secure the nails 24 within the nail receiving holes, the nails are provided with barbs or projections 32 which grip the body 16 and prevent the nails from working loose. The nails and nail receiving holes are sized to provide a tight fit for the nails so the nail receiving hole will guide the nail along a straight line as the nail point 26 passes through the rope so the nail will be aligned with the nail receiving hole on the opposite side of the passages.

As shown in FIG. 2, the bore 18 is flared radially outward at its ends as indicated at 19. This flare provides a smooth surface for engagement with the rope and prevents wear.

The fastener is preferably made of a material which will not mar the surface of other objects used in connection with the rope fastener. For example, the fastener should not scratch the surface of a boat. Furthermore, the fastener material should be resilient to stretch without cracking when the nails are driven through the fastener body. A thermoplastic resin is well suited to provide both of these features.

As used throughout this patent, the term rope is used to designate a rope or cord made of hemp, cotton, nylon or other similar materials. The term rope is not intended to include a cable made from metal fibers. Tension loads applied to the rope will exert a bending load on each nail. The bending stiffness of the nails 24 is large as a result of the nails being supported at both axial ends of the nails by the fastener body 16. The number and size of the nails used in the fastener will depend upon the tensile loads which must be carried by the rope. Preferably, the fastener will be stronger than the rope so that the rope will fail before the fastener.

In FIG. 4, a fastener 38 is shown having a body 40 with a single longitudinal bore 42 extending through the body. The fastener 38 is used to attach two ropes 44, 46 together end to end by inserting one end of rope 44 into the bore 42 through end 50 of the body 40 while one end of rope 46 is inserted into the bore 42 through the opposite end 52 of the fastener body 40. A plurality of transverse nail receiving holes 48 extend through the body and diametrically through the bore 42 to enable nails, not shown in FIG. 4, to be driven through the ropes 44, 46 and the fastener body 40 to secure the ropes within the longitudinal bore 42.

Another fastener 56 is shown in FIG. 5 and is useful for mounting of flags and other similar devices to a rope 57. The fastener 56 includes a body portion 58 having a longitudinal bore 59 extending therethrough. A mounting portion 60 is integrally formed with the body 58 and extends radially outward therefrom and includes an aperture 62. A clasp 64 is mounted to the mounting portion 60 through the aperture 62 and secures a flag 66 to the rope through the eyelet 68 in the flag. Because the loads experienced by the fastener 56 are considerably less than the loads experienced by the fasteners 10 and 40 of FIGS. 1 and 4 respectively, only a single nail receiving hole 70 extends through the fastener body 58 on both sides of the bore 59. The rope fastener 56 is a convenient device for fastening a flag to a rope without requiring a number of knots in the rope.

FIG. 6 illustrates another rope fastener 72 having a body 74 with three bores 76, 78, 80 longitudinally through the body. Each of the longitudinal bores includes a plurality of nail receiving holes 82 extending through the fastener body 74 and diametrically across the longitudinal bores. The nails 84 have been driven through the nail receiving holes to form a rope ladder. The rope ladder is constructed by feeding a central rope 86 through the center longitudinal bore 80 of a number of fasteners 72. The fasteners are attached to the central rope 86 at regularly spaced locations along the length of the central rope 86. A rope 88a-c is attached to each fastener 72 by inserting the ends of the ropes into the two outer longitudinal bores 76 and 78 so as to form loops or stirrups 90a-c extending downward from the body 74. The stirrups 90a-c provide foot supports for a person to climb once the central rope 86 has been secured at its upper end. Such a rope ladder is particularly useful on sail boats where the ladder can be used to climb a sail mast to tend to the boat's sails.

Another rope fastener 96 is shown in FIG. 7 and is useful for fastening a mounting device to the end of a rope. The fastener 96 includes a body portion 98 and a circular mounting portion 100 forming a boss having a circular aperture 102 therethrough. The body portion 98 includes a longitudinal bore 103 having a plurality of nail receiving holes 104 extending diametrically across the longitudinal bore 103 and through the body portion 98 on both sides of the longitudinal bore. One end of a rope 106 is inserted into the longitudinal bore and is anchored to the fastener 96 by a number of nails inserted through the nail receiving holes and the rope 106. The aperture 102 in the mounting portion 100 can be used to attach the end of the rope to various objects without requiring the use of a knot or woven loop in the rope.

Fastener 110 shown in FIG. 8 is similar to fastener 96. The fastener 110 includes a body portion 112 and a mounting portion 114 which is in the form of a hook. The body portion 112 includes a longitudinal bore 116 and a plurality of nail receiving holes 118 extending through the body portion and diametrically across the bore 116. The fastener 112 is attached to the end of the rope 120 by inserting the rope into the bore 116 and fastening the rope therein with nails extending through the nail receiving holes and the rope 120. The hook mounting portion 114 can be used to temporarily fasten the end of the rope to various objects, again, without requiring a knot or woven loop in the rope. The fasteners disclosed in FIGS. 7 and 8 can also be used with elastic cords such as those used to tie-down cargo, etc.

The rope fastener of the present invention provides a new and useful way of making connections of one rope to another or a rope to another object or to form a loop at the end of a rope. The fastener is preferably made of a resilient thermoplastic resin that will not crack from nails being driven into it, or will not fracture from high tensile loads, and will not scratch or damage other objects with which it comes into contact. By use of corrosion resistant nails to attach a rope to the fastener, the fastener is particularly suited for marine applications. Neither the fastener body or the nails will rust or deteriorate in water and, in addition, the fastener will not mar a boat surface.

It is to be understood that the invention is not limited to the exact construction and described above, but that various changes and modifications may be made without departing from the spirit and scope of the invention as defined in the following claims.

What is claimed is:

1. A rope fastener comprising:
   a body portion of a resilient material;
   said body portion having at least one passage of a size to receive a rope therein, said passage extending longitudinally through said body portion;
   said body portion having at least one nail receiving hole transverse to said at least one passage and extending diametrically across said passage and through said body on opposite sides of said passage; and
   at least one nail for insertion into said at least one nail hole to extend diametrically through the rope in said at least one passage to retain said rope in said passage, said nail extending into said body portion on the opposite side of said body portion from where said nail is inserted into said body portion, said nail and said nail receiving hole being sized so that said resilient body portion is deformed by said nail to retain said nail therein.

2. The fastener of claim 1 wherein said resilient material is a thermoplastic resin.

3. The fastener of claim 1 wherein said nail is of a non-corrosive metal.

4. The fastener of claim 1 wherein said nail includes means for securing said nail to said body portion after said nail is driven into said body.

5. The fastener of claim 1 having a single longitudinal passage through said body portion and said at least one nail receiving hole includes a plurality of nail receiving holes through said body and said passage so as to enable one end of a first rope inserted in a first end of said body portion into said passage to be retained therein by nails extending through a portion of said plurality of nail receiving holes and said first rope and to enable one end of a second rope inserted in the opposite end of said body into said passage to be retained therein by nails extending through the remainder of said plurality of nail receiving holes and said second rope whereby said first and second ropes are fastened together in end to end relationship.

6. The fastener of claim 1 wherein said at least one passage includes two parallel passages through said body, said body having a plurality of nail receiving holes extending through said body on opposite sides of said passages and diametrically across each of said passages.

7. The fastener of claim 1 wherein said at least one passage includes three parallel passages through said body, said body having a plurality of nail receiving holes extending through said body on opposite sides of said passages and diametrically across each of said passages.

8. The fastener of claim 1 further comprising a mounting portion integrally formed with said body portion including means for securing an object to said fastener.

9. The fastener of claim 8 wherein said securing means comprises a hook.

10. The fastener of claim 8 wherein said securing means comprises a circular mounting boss having an aperture therethrough.

11. A rope fastener comprising:
    a body portion of a resilient thermoplastic resin;
    said body portion having at least one longitudinal passage of a size to receive a rope therein extending through said body portion;
    said body portion having a plurality of nail receiving holes transverse to said at least one longitudinal passage and extending through said body portion diametrically across said at least one passage; and
    at least one corrosion resilient nail for insertion into said nail receiving holes and diametrically through the rope inserted in said at least one longitudinal passage to attach said fastener to said rope, said nail extending into said body portion on the opposite side from where said nail is inserted into said body portion, said nail and said nail receiving holes being sized so that said resilient body portion is deformed by said nail to retain said nail therein.

12. The fastener of claim 11 wherein each of said nail receiving holes includes a countersink at one end to enable the heads of said nails to be positioned below the surface of said body portion.

13. The fastener of claim 11 wherein said at least one passage includes a plurality of passages extending through said body portion.

14. The fastener of claim 11 further comprising a mounting portion integrally formed with said body portion, said mounting portion including means for securing an object to said fastener.

* * * * *